UNITED STATES PATENT OFFICE.

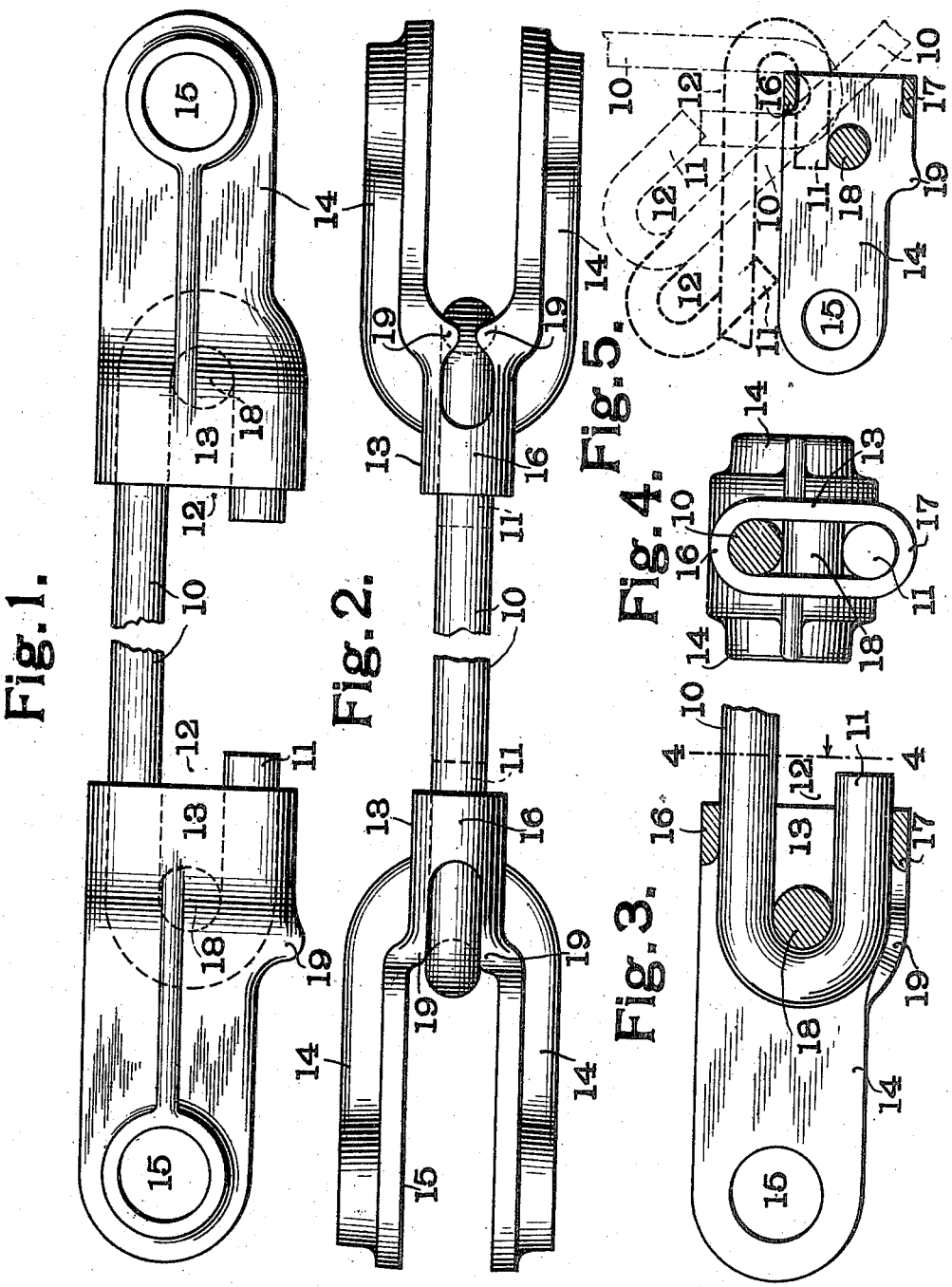

LOUIS A. HOERR, OF ST. LOUIS, MISSOURI.

BRAKE-ROD JAW.

983,901.  Specification of Letters Patent.  Patented Feb. 14, 1911.

Application filed August 31, 1910. Serial No. 579,949.

*To all whom it may concern:*

Be it known that I, LOUIS A. HOERR, a citizen of the United States, residing at the city of St. Louis, Missouri, have invented a certain new and useful Brake-Rod Jaw, of which the following is such a full, clear, and exact description as will enable any one skilled in the art to which it appertains to make and use the same, reference being had to the accompanying drawings, forming part of this specification.

Heretofore brake rod jaws have usually been formed with a pair of passages in the shank of the jaw for receiving the sides of a loop formed in the brake rod. One objection to such construction is that it is necessary to form the loop in at least one end of the rod after the straight end has been passed through one of the passages. This necessitates the making of the loop by hand by the person assembling the brake with the result that the length of the brake rod cannot be accurately determined as the loop cannot be made with any degree of accuracy by hand. Another objection to this form of brake rod jaw is that the removal of a broken jaw and the replacing of a new one is attended with great difficulty owing to the necessity of straightening the loop in the rod.

The object of my invention is to overcome the difficulties above referred to by so forming the jaw that the rod may have the loop formed in it previous to insertion in the jaw.

In the accompany drawings which illustrate one form of jaw made in accordance with my invention, Figure 1 is a plan view; Fig. 2 is a view at right angles to Fig. 1; Fig. 3 is a longitudinal section; Fig. 4 is a cross section on the line 4—4 of Fig. 3 and Fig. 5 is a reduced sectional view showing the manner of inserting the brake rod.

Like marks of reference refer to similar parts in the several views in the drawings.

10 is the brake rod. The brake rod 10 has its ends 11 turned over so as to leave spaces 12 between the ends 11 and the body 10 as best shown in Figs. 1 and 3. Each end of the brake rod 10 is thus formed into an open loop. The jaw consists of a shank 13 carrying a pair of arms 14 adapted to receive the brake connections and be pivoted thereto by means of pivot pin openings 15. The shank 13 is link-shaped and is provided with ends 16 and 17 respectively, the end 17 being of any desired width but the end 16 being of no greater width than the space 12 between the end 11 and the body 10 of the brake rod. Slightly forward of the end pieces 16 and 17 the shank of the jaw is provided with a web 18 which is preferably circular in cross section, as best shown in Fig. 3. This web 18 is substantially of the same diameter as the passage 12 so as to allow the loop in the end of the rod to be drawn over the said web 18, as shown in Fig. 3. The end 11 of the rod is prevented from spreading by means of the end piece 17. In order to prevent the loop from moving forward from its position I provide the shank 13 with a pair of lugs 19 which are adapted to be bent down, as best shown in Figs. 2 and 3, so as to engage with the curved end of the loop in the rod 10 and thus prevent its forward movement. It will be understood that the brake jaw is formed of material which will allow of the lugs 19 being bent down without breaking.

In inserting the brake rod 10 into the jaw, the end 11 is passed around the end piece 16 of the shank of the jaw, as shown in dotted lines in Fig. 5. The rod 10 may then be moved around in the various positions shown in dotted lines in this figure until the end is brought into position to drop down in front of the web 18 and so be drawn into position. It will be readily understood that in replacing the jaw with a new one it is not necessary to bend the brake rod 10 as the jaw can readily be removed by prying the lugs 19 out of their original position.

Having fully described my invention, what I claim as new and desire to secure by Letters Patent of the United States is:

1. The combination with a brake rod provided on its end with an open loop, of a brake rod jaw having an integral bifurcated shank, a web extended between the sides of said shank and forming a seat for the rod, and a pair of keepers for the loop situated at the rear of said web; one of said keepers being adapted to receive said loop.

2. The combination with a brake rod provided at its end with an open loop the free end of which returns toward the body of the rod, of a brake jaw having an integral shank, one end of said shank being adapted to enter said loop, a web formed integral with said shank and adapted to be embraced by said loop, and means for preventing the spreading of the loop.

3. The combination with a brake rod provided at its end with an open loop the free end of which returns toward the body of the rod, of a jaw adapted to embrace a brake connection and be pivoted thereto, said jaw being provided with an integral shank, said shank being provided with a web adapted to be embraced by said loop, one side of the end of said shank engaging with the free end of the rod to prevent the spreading of the loop, and a lug carried by said shank and adapted to be bent into engagement with said loop.

4. In a brake rod jaw, the combination with a brake rod provided at one end with an open loop the free end of which returns toward the body of the rod, of a jaw adapted to embrace a brake connection and be pivoted thereto, said jaw being provided with an integral shank, one side of the end of said shank being adapted to enter said open loop, said shank being provided with a web adapted to be embraced by said loop, and the opposite side of the end of said shank engaging with the free end of said rod to prevent spreading of the loop.

5. In a brake rod jaw, the combination with a brake rod provided at one end with an open loop the free end of which returns toward the body of the rod, of a brake jaw adapted to embrace a brake connection and be pivoted thereto, said jaw being provided with an integral shank, one side of the end of said shank being adapted to enter said open loop, a web carried by said shank and adapted to be embraced by said loop, and a lug adapted to be bent into engagement with the end of said loop to prevent its forward movement.

6. In a brake rod jaw, the combination with a brake rod provided at one end with an open loop the free end of which returns toward the body of the rod, of a brake jaw adapted to embrace brake connection and be pivoted thereto, said jaw being provided with an integral shank, one side of the end of said shank being adapted to enter said loop, said shank being provided with a web adapted to be embraced by said loop, the opposite side of the end of said shank engaging the free end of said rod to prevent the spreading of the loop, and a lug carried by said shank and adapted to be bent into engagement with said loop to prevent the forward movement of the same.

In testimony whereof, I have hereunto set my hand and affixed my seal in the presence of the two subscribing witnesses.

LOUIS A. HOERR. [L. S.]

Witnesses:
ELIZABETH BAILEY,
W. A. ALEXANDER.